Patented Sept. 8, 1953

2,651,620

UNITED STATES PATENT OFFICE 2,651,620

STABILIZED ORGANIC COMPOSITIONS

Eugene F. Hill, Detroit, and David O. De Pree, Birmingham, Mich., assignors to Ethyl Corporation, New York, N. Y., a corporation of Delaware No Drawing. Application December 9, 1950, Serial No. 200,116

8 Claims. (Cl. 260—45.9)

This invention relates to the stabilization of elastomers. More particularly, our invention relates to inhibition of attack by oxygen, and the prolongation of the useful life of elastomer compositions.

All elastomeric materials are more or less susceptible to deterioration by oxygen or ozone. By such materials we refer to both the naturally occurring rubbers and the various synthetic rubber or rubber-like elastomers. The degradation of such materials occurs both in the uncured or intermediate stages as well as in the finished, compounded or fabricated stage. Naturally occurring rubbers after coagulation of the latex and synthetic elastomers after polymerization and coagulation are particularly susceptible to the action of oxygen, ozone and light. Before useful articles can be fabricated from such elastomers various compounding, milling, vulcanization, curing, calendering, molding, extrusion or other processes or combinations thereof must be performed, during any of which operations such exposure can occur, and some means of protection is required to permit successful manufacture of the desired stock or article. Furthermore, during storage and use such exposure is encountered with deleterious effects unless suitable protective measures are taken.

This exposure can result in the destruction to a greater or less extent of certain useful physical properties and in the introduction of certain properties which render articles manufactured from such elastomers of limited utility. By adsorption of oxygen or ozone such elastomers deteriorate prematurely, lose tensile strength and flexibility and become discolored, embrittled and surface cracking may occur. While certain materials have been proposed for the protection of such elastomers from the deleterious action of oxygen, most of such protective substances, as for example β-naphthol, possess the serious disadvantage, particularly with respect to light colored stocks, that the decomposition products of the protectant are themselves colored and hence interfere with the color fastness of the stocks being protected.

It is a primary object of our invention to provide a class of compounds which possesses the ability of inhibiting deterioration of elastomeric or plastic substances in the presence of oxygen. A further object of our invention is to retard the deterioration of such substances which normally are susceptible to attack by oxygen or ozone, and which thereby lose the utility in the service for which they were manufactured, compounded or otherwise prepared. A more particular object is to render elastomer stocks and elastomer compositions stable on prolonged storage or during manufacture or use in the presence of oxygen. Still other objects will appear hereinafter.

The above objects can be accomplished by practicing our invention which comprises adding to organic materials a small proportion of a substance derived from the class of hydroxy- and amino-substituted phenyl-ureas and -thioureas. Our invention resides not in the determination that certain elastomeric materials can be treated to prevent oxidative deterioration, but rather in providing a class of compounds which has broad utility in providing such protection.

In general the compounds of our invention can be defined as those which contain the grouping.

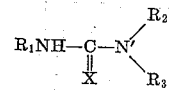

wherein $R_1$ is alkyl, aryl, or $R_2$, $R_2$ is hydroxyphenyl or aminophenyl, $R_3$ is hydrogen, alkyl or aryl and X is the oxygen or sulfur atom. Whenever in the further description of our invention hereinafter we refer to the term "alkyl," it is to be understood that we include straight chain, branched chain and cyclic saturated hydrocarbon radicals. Examples of such alkyl radicals include methyl, ethyl, propyl, n-octadecyl, isopropyl, isobutyl, sec.-butyl, 2-methylhexyl, cyclohexyl, methylcyclohexyl, β-cyclohexylethyl, etc.

To further illustrate the nature of these protective substances the generalized formula

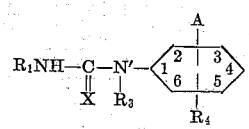

is presented to depict the substituted ureas and thioureas of our invention wherein $R_1$ represents alkyl or aryl radicals, X stands for the oxygen or sulphur atom, $R_3$, and $R_4$ represent hydrogen or organic radicals further defined hereinafter, and A refers to the activating groups described hereinafter. In this generalized formula the numbers inserted in the phenyl radical are for the purpose of naming specific embodiments of our invention hereinafter. We have found that such compounds of our invention, wherein the activating group, A, of the phenyl radical is in the ortho or para position with respect to the N'-nitrogen atom, exhibit the greatest effectiveness and are preferred, although some activity is shown by the meta derivatives. The principal function of the groups $R_1$, $R_3$, and $R_4$ is believed to be to impart the proper balance of the properties of miscibility and compatibility to the antioxidant with the elastomeric substance which is to be protected. While the principal effect of these groups is as stated above, $R_1$ can be further chosen to intensify the action of the principal antioxidant forming groups, and in particular this intensifying action is obtained by choosing $R_1$ as a phenyl group substituted with one of the components A. In general the phenyl substituents, A, which we refer to as activating groups, comprise amino and hydroxy radicals and hydrocarbon derivatives thereof. Thus, we can illustrate the group A by amino, N-methylamino, N,N-dimethylamino, N,N-diethylamino, N,N - methylethylamino, N,N - ethylbutylamino, N,N-diisopropylamino, N-cyclohexylamino, N,N-cyclohexylmethylamino, hydroxy, etc. Thus, examples of the hydroxyphenyl and aminophenyl groups of our invention which impart the distinctive antioxidant activity to our stabilizing compounds include p-hydroxyphenyl, o-hydroxyphenyl, m-hydroxyphenyl, 3-methyl-4-hydroxyphenyl, 2-pentadecyl-4-hydroxyphenyl, p-aminophenyl, p - n - butylaminophenyl, p - dimethylaminophenyl, p-cyclohexylaminophenyl, p-methylethylaminophenyl and p-diethylaminophenyl.

Those substituents $R_1$, $R_3$ and $R_4$ which are chosen primarily to impart superior compatibility properties to the compounds of our invention include alkyl, aryl, aralkyl, and alkaryl groups and substituted derivatives thereof. For example we have obtained good miscibility characteristics and maintained the high antioxidant effectiveness of the compounds of our invention by various combinations of hydrogen, o-chlorophenyl, phenyl, naphthyl, tolyl, methyl, ethyl, n-propyl, isopropyl, n-butyl, amyl, pentadecyl, n-octadecyl, cyclohexyl, benzyl, p-ethoxyphenyl, p-methoxyphenyl, and β-hydroxyethyl groups on the N- and N'-nitrogen atoms or on the substituted phenyl radical characteristic of the compounds of our invention.

While we do not intend that our invention be limited by the choice of the groups $R_1$, $R_3$ and $R_4$, in the preferred embodiments of our invention these groups do not contain excessive amounts of certain atoms and radicals capable of offsetting the activating influence of the substituted phenyl radicals. For example, excessive amounts of halogen atoms or nitro groups are not preferred, although minor amounts can be tolerated.

The compounds of our invention may be further defined by reference to the following methods of preparation, which, while not restricting the scope of the variations possible in different embodiments of our invention, are representative of methods employed by us in preparing the specific materials described herein.

METHOD I

Unsymmetrical disubstituted ureas and thioureas of our invention have been prepared by reaction between substituted phenyl or alkyl isocyanates or isothiocyanates, and substituted anilines or alkylamines, one combination of which is represented by the equation

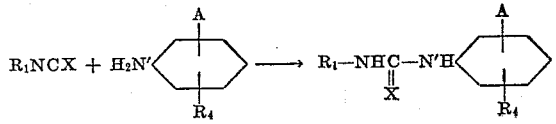

wherein the symbols have the same meaning as described hereinbefore. The reactants are mixed, in an appropriate solvent, at a temperature of about 50° C. and in a few hours the reaction product crystallizes and is recovered. By this method we have for example prepared the following compounds of our invention: N-(n-propyl)-N'-(p-hydroxyphenyl)urea, N - phenyl-N' - (p - hydroxyphenyl)thiourea, N - (n - octadecyl)-N'-(p-hydroxyphenyl)urea, N-(p-tolyl)-N'-(p-hydroxyphenyl)urea, N-phenyl-N'-(p-hydroxyphenyl)urea, N - phenyl-N'-(2-pentadecyl-4 - hydroxyphenyl)-urea, N - phenyl - N' - (3-methyl-4-hydroxyphenyl)urea, N,N' - diphenyl-N'-(p-hydroxyphenyl)urea, N-phenyl-N'-(p-dimethylaminophenyl)urea, N - phenyl - N' - (n-butyl)-N'-(p-hydroxyphenyl)urea, N-(p-ethoxyphenyl)-N'-(p-hydroxyphenyl)urea, N-(n-octadecyl) - N' - (p - dimethylaminophenyl)urea, N-phenyl - N'-(o - hydroxyphenyl)urea, N-phenyl-N'-(p-dimethylaminophenyl)thiourea, N-phenyl-N'-(m-hydroxyphenyl)urea, N-(β-naphthyl)-N'-(p-hydroxyphenyl)urea, N-(p-chlorophenyl)-N'-(p-hydroxyphenyl)urea, and N-octadecyl-N'-phenyl-N'-(p-hydroxyphenyl)urea.

METHOD II

Symmetrical thioureas containing two of the characteristic activating groups of the compounds of our invention have been prepared by heating carbon disulfide and substituted anilines in the presence of elemental sulfur according to the equation

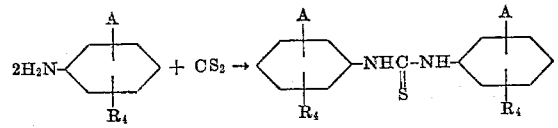

By this method we have prepared the following examples of the compounds of our invention: N,N'-bis(p - hydroxyphenyl)thiourea and N,N'-bis(p-dimethylaminophenyl)thiourea.

METHOD III

Certain symmetrical disubstituted ureas of our invention are prepared by warming an aqueous solution of the appropriate aniline hydrochloride with urea. This method is illustrated by the manufacture of N,N' - bis(p - hydroxyphenyl) urea.

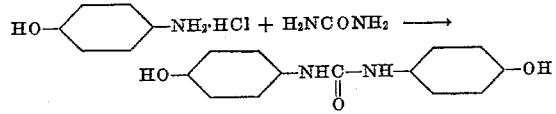

METHOD IV

We prepared certain N-alkylaminophenyl-ureas of our invention by hydrogen reduction of nitroaromatic ureas in the presence of an aldehyde ammonia, the method of "reductive alkylation," according to the equation

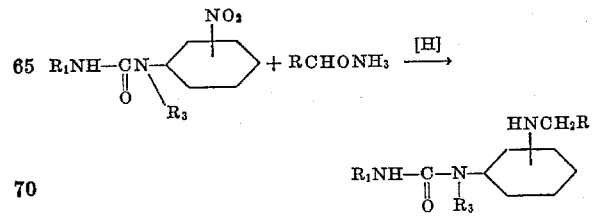

where R is an alkyl group. By this method we have prepared N-(p-hydroxyphenyl)-N'-(p-n-butylaminophenyl)urea, and N - (p - hydroxyphenyl)-N'-(p-isobutylaminophenyl)urea.

METHOD V

Symmetrical disubstituted ureas of our invention can be prepared by treating an aniline with phosgene, according to the equation

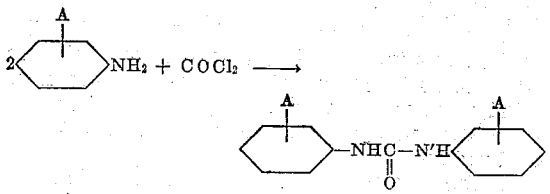

As an example of this method we have prepared N,N'-bis(p-hydroxyphenyl)urea thereby.

The compounds of our invention have wide utility in protecting elastomeric substances. Thus, we can increase the useful life of the natural rubbers, such as para or Hevea rubber, and India or Ficus rubber. Likewise synthetic elastomers, such as the butadiene or butadiene-styrene polymers, and the polyisobutylenes, can be protected against oxygen or ozone deterioration by our compounds. Furthermore, our antioxidant materials can be incorporated at any of various stages of the manufacturing operations, such as in the synthetic monomers, the polymeric or natural latexes, or during the coagulation, compounding, milling, or fabricating operations.

To illustrate the utility of the compounds of our invention in protecting such substances we selected a natural rubber compounded into a typical tire-tread formula. One requisite of such stocks is that the desirable properties incorporated therein by careful selection of the compounding ingredients and cure time shall be maintained during extended periods of storage or use in the presence of oxygen. Comparison of various rubber stocks is best carried out on stocks initially having the same state of cure. The most reliable means for determining the state of cure is by the T-50 test, ASTM designation: D599-40T, described in the ASTM Standards for 1946, Part III-B. This test measures the temperature at which a test piece recovers its elasticity when it is stretched at room temperature, frozen at a sufficiently low temperature to cause it to lose its elastic properties, and then gradually warmed. In practice the temperature noted is that at which the sample recovers to 50 per cent of the original elongation and is, therefore, referred to as the T-50 value. In the examples that follow, stocks for testing and comparison were cured for a time sufficient to have a T-50 value of +1° C., so that a valid comparison of the properties could be made. The accelerated aging was conducted by the procedure of ASTM designation: D572-42, described in the ASTM Standards for 1946, Part III-B, for a period of 96 hours at a temperature of 70° C., with an initial oxygen pressure in the test bomb of 300 pounds per square inch gauge on specimens having the following composition:

|  | Parts by weight |
|---|---|
| Smoked sheet | 100.00 |
| Carbon black | 45.00 |
| Zinc oxide | 5.00 |
| Stearic acid | 3.00 |
| Pine tar oil | 2.00 |
| Sulfur | 3.00 |
| Mercapto-benzothiazole | 0.65 |
| Stabilizing ingredient | 1.00 |
|  | 159.65 |

To demonstrate the protection afforded to the rubber by the compounds of our invention, the tensile strength and the ultimate elongation of stocks prepared with the addition of the antioxidants of our invention were determined before and after aging and were compared with the same properties determined on an identical rubber stock not protected by the compounds of our invention but having the same state of cure. Both of these properties were determined by means of the test procedure of ASTM designation: D412-41, fully described in ASTM Standards for 1946, Part III-B. The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom. Thus, the degree to which these properties are retained is a direct measure of the utility of the protective substance.

TABLE I
EFFECT ON AGING PROPERTIES OF RUBBER

| No. | Antioxidant | Percent of original retained after aging | |
|---|---|---|---|
|  |  | Tensile Strength | Ultimate Elongation |
| 1 | N,N'-Bis (p-dimethylaminophenyl)-thiourea. | 43.3 | 71.5 |
| 2 | N-Phenyl-N'-p-dimethylamino-phenylthiourea. | 40.5 | 69.0 |
| 3 | N-Phenyl-N'-p-hydroxyphenylthiourea. | 34.0 | 63.5 |
| 4 | N-Phenyl-N'-p-hydroxyphenylurea. | 31.0 | 65.0 |
| 5 | N,N'-Bis(p-hydroxyphenyl) thiourea. | 29.0 | 65.2 |
| 6 | None | 24.5 | 55.0 |
| 7 | o-Phenylenethiourea | 12.9 | 27.3 |
| 8 | N,N'-Diphenylthiourea | 10.6 | 39.2 |

By referring to Table I it is at once apparent that all samples containing representative members of the compounds of our invention (Nos. 1, 2, 3, 4, and 5) showed a remarkable increase in the retention of the original tensile strength and ultimate elongation over the control which contained no protective additive (No. 6). Comparing No. 8 with Nos. 1 through 5 clearly shows the activating influence of the above-described grouping essential to the preferred embodiment of our invention. Thus, in the absence of the hydroxyl or substituted amino group on the phenyl- urea or thiourea, as in N,N'-dephenylthiourea, not only is there a lack of protective action, but the unsubstituted phenyl-thiourea acts as a pro-oxidant, that is the rubber has lost a greater proportion of its desirable properties upon aging when this compound is incorporated therein, than in its absence. Similarly, the o-phenylenethiourea exhibits a similar pro-oxidant effect, despite the fact that this compound has been claimed as an effective antioxidant.

The quantities of the compounds of our invention incorporated in the materials to be stabilized are not critical and depend largely upon the type of elastomer or formulation being stabilized and the conditions under which the exposure to oxygen occurs. For the majority of applications the compounds of our invention are preferably employed in amount between the limits of approximately 0.1 and 2.0 parts per 100 parts of material to be stabilized, although somewhat larger amounts of the stabilizers of our invention can be tolerated and in some instances are preferred. Thus, our compounds can be satisfactorily employed in a wide range of concentrations, and we do not intend that our invention be restricted to the specific quantities mentioned herein.

We have disclosed a number of preferred embodiments of our invention and illustrated several means whereby protection can be afforded to elastomeric materials sensitive to attack by oxygen. Our invention is not intended to be limited to the specific embodiments of our invention herein or to the means described herein for obtaining the advantages possible in employing our compounds, as other methods of practicing our invention will be apparent to those skilled in the art.

We claim:

1. An elastomeric formulation containing a rubber-like olefin-containing hydrocarbon polymeric elastomer normally susceptible to atmospheric deterioration and containing as an antioxidant ingredient, in quantity sufficient to inhibit such deterioration, a member selected from the group consisting of substituted ureas and thioureas wherein at least one of the nitrogen atoms is substituted with a radical selected from the group consisting of hydroxyphenyl, aminophenyl, and alkylaminophenyl, and the other nitrogen atom is substituted with a radical selected from the group consisting of alkyl and aryl.

2. The composition of claim 1 wherein said antioxidant ingredient is N,N'-bis(p-dimethylaminophenyl)-thiourea.

3. The composition of claim 1 wherein said antioxidant ingredient is N-phenyl-N'-p-dimethylaminophenylthiourea.

4. The composition of claim 1 wherein said antioxidant ingredient is N-phenyl-N'-p-hydroxyphenylthiourea.

5. The composition of claim 1 wherein said antioxidant ingredient is N,N'-bis(p-hydroxyphenyl)thiourea.

6. The formulation of claim 1 in which the antioxidant ingredient is a substituted thiourea wherein at least one of the nitrogen atoms is substituted with an hydroxy phenyl radical and the other nitrogen atom is substituted with an aryl radical.

7. The formulation of claim 1 in which the antioxidant ingredient is a substituted thiourea wherein at least one of the nitrogen atoms is substituted with an aminophenyl radical and the other nitrogen atom is substituted with an aryl radical.

8. The formulation of claim 1 in which the antioxidant ingredient is a substituted thiourea wherein at least one of the nitrogen atoms is substituted with an alkyl aminophenyl radical and the other nitrogen atom is substituted with an aryl radical.

EUGENE F. HILL.
DAVID O. DE PREE.

References Cited in the file of this patent

UNITED STATES PATENTS

| Number | Name | Date |
|---|---|---|
| 2,555,167 | Van Dijk et al. | May 29, 1951 |

OTHER REFERENCES

Fisher, Article in Ind. & Eng. Chem., vol. 31, Aug. 1939, page 942.